(12) United States Patent
Gage et al.

(10) Patent No.: US 7,733,596 B2
(45) Date of Patent: Jun. 8, 2010

(54) SYSTEM AND METHOD FOR IDENTIFYING THE SIGNAL INTEGRITY OF A SIGNAL FROM A TAPE DRIVE

(75) Inventors: Donald B. Gage, Leander, TX (US); Donald C. Guthan, Round Rock, TX (US); William Theobald, Austin, TX (US); Randall H. Zumwalt, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 217 days.

(21) Appl. No.: 11/955,962

(22) Filed: Dec. 13, 2007
(Under 37 CFR 1.47)

(65) Prior Publication Data

US 2009/0154005 A1    Jun. 18, 2009

(51) Int. Cl.
*G11B 5/584* (2006.01)
(52) U.S. Cl. .................................................. 360/77.14
(58) Field of Classification Search .............. 360/77.14, 360/77.12
See application file for complete search history.

(56) References Cited

U.S. PATENT DOCUMENTS

| | | | | |
|---|---|---|---|---|
| 4,549,295 A | | 10/1985 | Purvis | |
| 4,630,283 A | * | 12/1986 | Schiff | 375/143 |
| 4,815,068 A | * | 3/1989 | Dolby et al. | 369/88 |
| 5,185,806 A | * | 2/1993 | Dolby et al. | 381/106 |
| 5,416,607 A | * | 5/1995 | Tezuka et al. | 358/468 |
| 6,125,343 A | * | 9/2000 | Schuster | 704/201 |
| 6,385,314 B1 | * | 5/2002 | Furuya | 379/219 |
| 6,480,556 B1 | * | 11/2002 | Guey | 375/343 |
| 6,687,305 B1 | * | 2/2004 | Nakamura et al. | 375/240.26 |
| 6,754,274 B2 | * | 6/2004 | Park | 375/240.25 |
| 6,947,874 B2 | * | 9/2005 | Chen | 702/189 |
| 7,088,764 B2 | * | 8/2006 | Kaewell, Jr. | 375/140 |
| 2001/0048486 A1 | * | 12/2001 | Akama et al. | 348/700 |
| 2002/0051498 A1 | * | 5/2002 | Thomas et al. | 375/262 |
| 2005/0075098 A1 | * | 4/2005 | Lee et al. | 455/414.1 |
| 2005/0123267 A1 | * | 6/2005 | Tsumagari et al. | 386/46 |
| 2007/0116055 A1 | * | 5/2007 | Atsumi et al. | 370/476 |
| 2007/0274407 A1 | * | 11/2007 | Thomson et al. | 375/260 |
| 2009/0150412 A1 | * | 6/2009 | Idicula et al. | 707/100 |

* cited by examiner

*Primary Examiner*—Fred Tzeng
(74) *Attorney, Agent, or Firm*—Baker Botts L.L.P.

(57) ABSTRACT

A system and method for identifying signal degradation in a tape drive is disclosed in which a data signal read from the tape drive and the signal characteristics of the undecoded portion of the data stream are compared with a set of known values. The undecoded portion of the data may comprise the preamble portion of the signal and the comparison set of known values may be saved to local storage on the tape drive. If the comparison of the signal characteristics of the undecoded portion of the data stream and the known set of signal values indicates that data signal is degraded, a notification is generated that indicates that the signal at the tape drive is degraded.

20 Claims, 2 Drawing Sheets

SYSTEM AND METHOD FOR IDENTIFYING THE SIGNAL INTEGRITY OF A SIGNAL FROM A TAPE DRIVE

TECHNICAL FIELD

The present disclosure relates generally to computer systems and information handling systems, and, more particularly, to a system and method for identifying the signal integrity of a signal from the tape drive.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include a tape drive. A tape drive is a mechanical device that controls the movement of magnetic tape within a tape cartridge. A tape drives includes a drive head that reads and writes data to the tape. Over time, debris may accumulate on the head of the tape drive, and the head of the tape drive will need to be cleaned. If the head of the tape drive is not cleaned periodically, the head of the tape drive will cause read and write errors by introducing errors into the data signals that are read from or written to the magnetic tape. Although error identification and correct schemes attempt to correct errors introduced by the head, some error identification and correction schemes involve a lengthy analysis that may involve analyzing several tapes before the process is complete. During this lengthy error identification process, additional errors may be introduced into the signals read from or written to the magnetic tape. The introduction of these additional errors results in more error correction steps, which negatively affects the operation of the tape drive.

SUMMARY

In accordance with the present disclosure, a system and method for identifying signal degradation in a tape drive is disclosed in which a data signal read from the tape drive and the signal characteristics of the undecoded portion of the data stream are compared with a set of known values. The undecoded portion of the data may comprise the preamble portion of the signal and the comparison set of known values may be saved to local storage on the tape drive. If the comparison of the signal characteristics of the undecoded portion of the data stream and the known set of signal values indicates that data signal is degraded, a notification is generated that indicates that the signal at the tape drive is degraded.

The system and method for identifying signal degradation in a tape drive that is disclosed herein is advantageous in that it provides for the responsive and precise identification of signal errors. The analysis of the preamble and postamble portions of signals and the comparison of the parameters of those signals with baseline values provides for the rapid identification and notification of signal degradation. In addition, the precise identification of the source of the error allows user correction of many errors through the cleaning of the heads of the tape drive. As a result, the user is quickly notified of errors and is able to quickly correct those errors, thereby preventing additional errors from being transmitted in the data stream.

The system and method disclosed herein is also advantageous in that it the baseline values can be stored to local storage on the tape drive itself. Because the baseline values are stored to the tape drive, the signal analysis can be performed on the processor of the tape drive without involving memory in other locations in the computer system, thereby reducing the time and complexity of the error identification process. The system and method disclosed herein is also advantageous in that the generated notification signal may identify the type of signal degradation being experienced by the signal. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
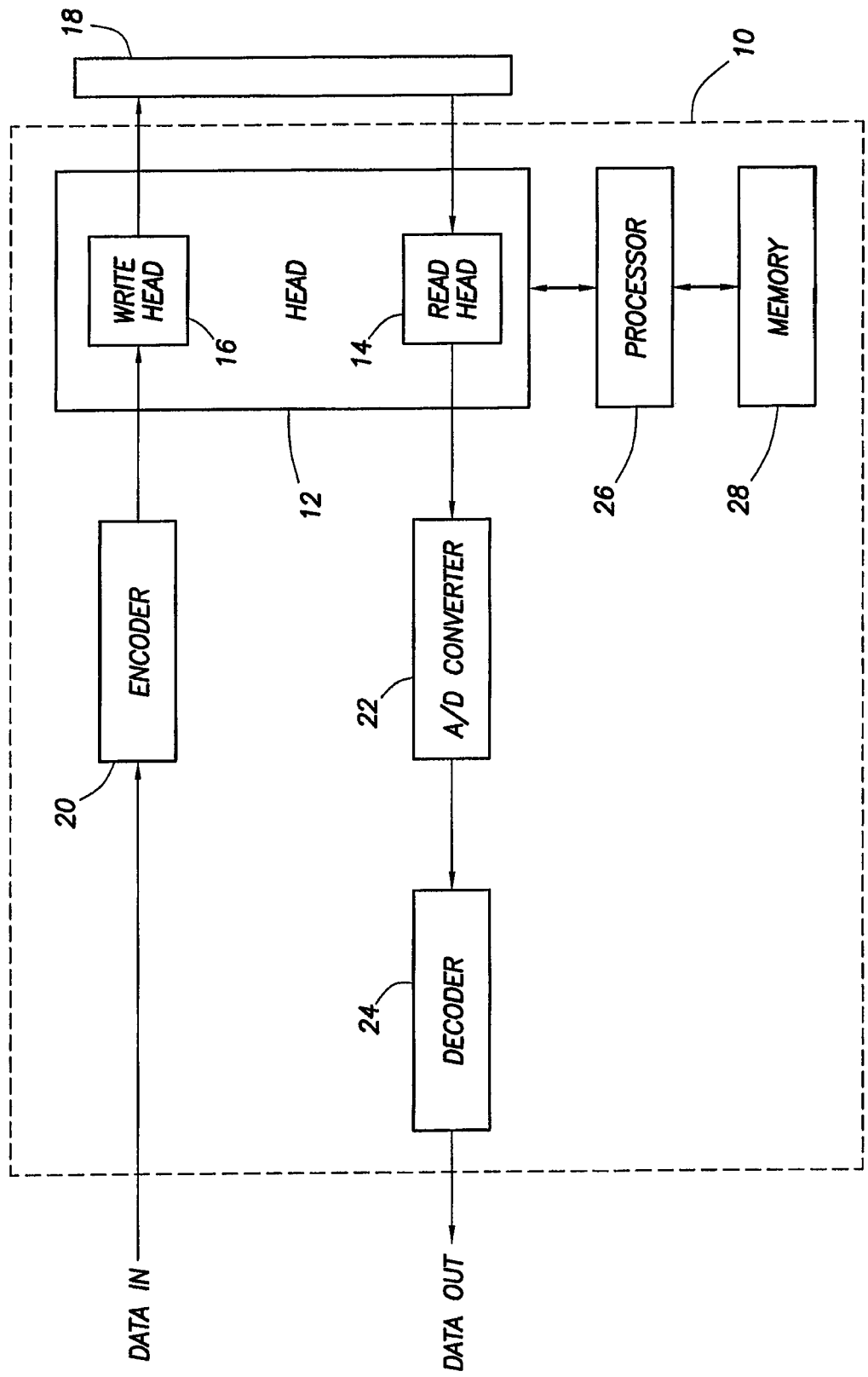
FIG. 1 is a block diagram of elements of a tape drive.

Shown in FIG. 1 is a block diagram of elements of a tape drive, which is indicated by the dashed box at 10. Tape drive 10 includes a head 12, which includes a read head 14 and a write head 16. Write head 16 writes a data signal to media 18, and read head 14 reads a data signal 14 from media 18. Data to be written to the media is first encoded at encoder 20 before being transmitted to write head 16. After read head reads data from media 18, the analog data is converted to digital data at AID converter 22 before being decoded at decoder 24. Also included in tape drive 10 is a processor 26, which is capable of reading the data stream at write head 16 or read head 14. Processor 26 is also able to monitor the settings of write head 16 and read head 12, including the automatic gain control settings used to adjust the characteristics of the signals at the write head or the read head. Processor 26 is also able to read data from flash memory or firmware 28 within the tape drive.

Figure 2:
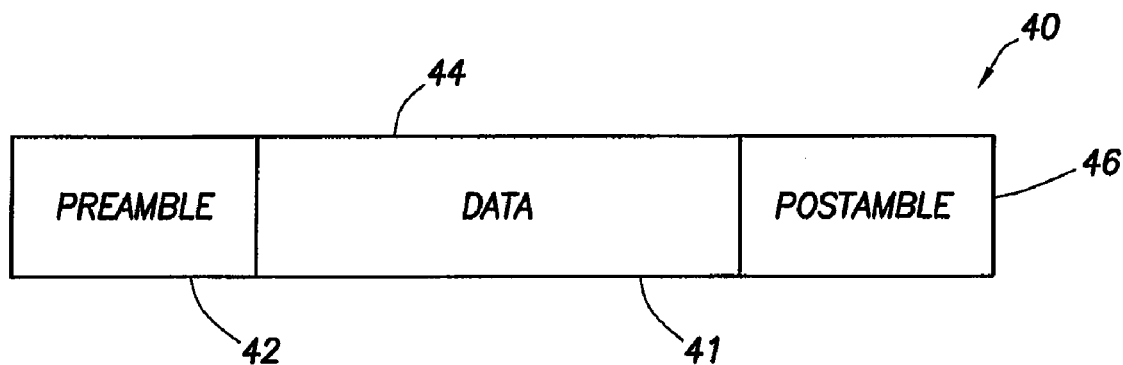
FIG. 2 is a diagram of the data structure of the data stream at the read head or the write head of the tape drive.

A data stream at the read head 14 or the write head 16 has the data structure shown in FIG. 2. Data stream 40 of FIG. 2 includes a segment 41 that includes a preamble section 42, a data portion 44, and a postamble section 46. Preamble 42 and postamble 46 include control data for the segment 41. The content of the signal is included in data portion 44. The tape drive disclosed herein may use the partial response maximum likelihood (PRML) method of data encoding to convert the analog signal from the media to a digital signal. Because of the interpretive nature of PRML decoding, PRML decoding may hamper the ability of the tape drive to measure the amount of signal degradation occurring at the read head and the write head of the computer system. PRML decoding, however, is not used in the preamble or postamble portions of the data stream. Instead, the constant frequency waveform of the preamble and postamble is used to set the phase locked loop of the read channel. Because the preamble and postamble portions of the data stream are not decoded, and therefore comprise undecoded portions of the data stream, the characteristics of this waveform in the preamble and postamble portions of the data stream can be evaluated to determine whether the head of the tape drive is introducing errors into the data stream.

Figure 3:
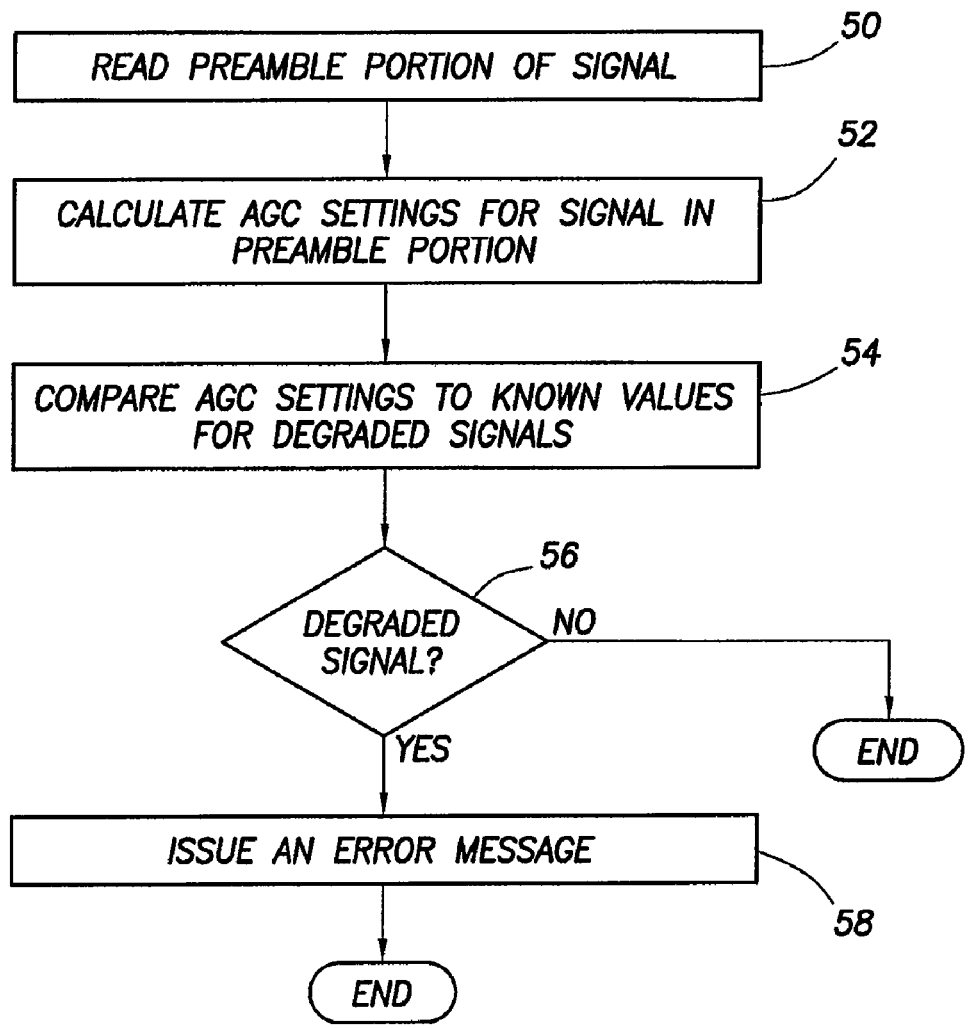
FIG. 3 is a flow diagram of a series of method steps for identifying whether the head of the tape drive is introducing errors into the data stream.

Shown in FIG. 3 is a flow diagram of a series of method steps for identifying whether the head of the tape drive is introducing errors into the data stream. At step 50, processor 26 reads the preamble portion 42 of a data signal 40. Processor 26 at step 52 calculates a set of automatic gain control settings for the signal of the preamble portion 42. At step 54, processor 26 compares the calculated automatic gain control settings of step 52 to a saved set of setting in memory 28. The saved settings in memory 28 may comprise baseline settings that represent the automatic gain control settings of a data stream that were calculated and saved at a time when the head of the tape drive was clean and was not introducing errors into the data stream. At step 56, it is determined if the signal is degraded. Whether the signal is degraded is based on the degree to which the calculated settings differ from the baseline settings. If the calculated settings are sufficiently similar to the baseline settings, it is determined that the signal is not degraded and the method steps terminate. If the calculated settings are sufficiently different from the baseline settings, the signal is degraded, and an error message is issued to the user at step 58.

In addition to calculating gain control settings from the preamble, other parameters of the signal can be evaluated in the preamble or postamble portions of the signal including, signal asymmetry, noise, signal amplitude, or the lack of a signal. Each of these calculated or measured signals could be compared with known values stored in a memory location in the tape drive, thereby providing a point of comparison to evaluate whether the heads of the tape drive are introducing errors into the signal read from the tape drive. Further, each measured parameter could correspond to a unique error message that is transmitted to the user. For example, a measurement of poor signal amplitude as compared with a baseline measurement would result in an error message to the user that the strength of the signal is weak. As a second example, a measurement of noise in the preamble of postamble portions of the signal as compared with a baseline measurement would result in an error message to the user that noise is being introduced into the signal.

The system and method for identifying signal degradation in a tape drive that is disclosed herein is advantageous in that it provides for the responsive and precise identification of signal errors. The analysis of the preamble and postamble portions of signals and the comparison of the parameters of those signals with baseline values provides for the rapid identification and notification of signal degradation. In addition, the precise identification of the source of the error allows user correction of many errors through the cleaning of the heads of the tape drive. As a result, the user is quickly notified of errors and is able to quickly correct those errors, thereby preventing additional errors from being transmitted in the data stream. Although the present disclosure has been described in detail, it should be understood that various changes, substitutions, and alterations can be made hereto without departing from the spirit and the scope of the invention as defined by the appended claims.

What is claimed is:

1. A method for identifying errors produced by the heads of a tape drive, comprising:
   reading a data signal from media coupled to the tape drive;
   identifying a portion of the signal for which decoding is not performed;
   reading the undecoded portion of the signal;
   comparing the signal characteristics of the undecoded portion of the signal with a predetermined set of signal characteristics; and
   if it is determined from the comparison of the undecoded portion of the signal with the predetermined set of signal characteristics that the data signal is degraded, transmitting a notification indicating that signal read at the tape drive is degraded.

2. The method for identifying errors produced by the heads of a tape drive of claim 1, wherein the undecoded portion of the signal is the preamble portion of the signal.

3. The method for identifying errors produced by the heads of a tape drive of claim 1,
   wherein the data signal includes an encoded portion that is encoded with PRML; and
   wherein the undecoded portion of the signal is the preamble portion of the signal.

4. The method for identifying errors produced by the heads of a tape drive of claim 1, wherein the step of comparing the signal characteristics of the undecoded portion of the signal with a predetermined set of signal characteristics comprises,
   calculating a set of gain control settings for the undecoded portion of the signal; and
   comparing the calculated set of gain control settings to a saved set of gain control settings.

5. The method for identifying errors produced by the heads of a tape drive of claim 4, wherein the saved set of gain control settings are a baseline set of gain control settings associated with clean tape drive heads.

6. The method for identifying errors produced by the heads of a tape drive of claim 4, wherein the saved set of gain control settings in local storage of the tape drive.

7. The method for identifying errors produced by the heads of a tape drive of claim 1, wherein the notification indicating the signal read at the tape drive is degraded identifies the type of signal degradation being experienced at the signal.

8. The method for identifying errors produced by the heads of a tape drive of claim 1, wherein the signal characteristics of the undecoded portion of the signal comprise at least one of signal asymmetry, noise, and amplitude.

9. The method for identifying errors produced by the heads of a tape drive of claim 1, wherein the notification indicating the signal read at the tape drive is degraded identifies that the signal is degraded due to at least one of signal asymmetry, noise, and amplitude, as applicable.

10. A tape drive, comprising:
    a read head operable to create a data stream from media coupled to the tape drive;
    a processor coupled to the read head; and
    storage coupled to the process;
    wherein the processor is operable to compare the signal characteristics of a portion of the data stream that is not decoded to a set of signal characteristics stored in storage, and, if it is determined that the read head is introducing errors into the data stream, issue an error message.

11. The tape drive of claim 10, wherein the storage is local to the tape drive.

12. The tape drive of claim 11, wherein the gain control settings stored in storage are gain control settings associated with a tape drive having a clean head.

13. The tape drive of claim 10, wherein the tape processor is operable to compare a set of gain control settings generated from the undecoded portion of the data stream to a set of gain control settings stored in storage.

14. The tape drive of claim 10, wherein the error message issued by the processor identifies the error in the data stream.

15. The tape drive of claim 10, wherein the processor is operable to issue an error message that identifies that the data stream is encountering an error related to at least one of signal asymmetry, noise, or amplitude.

16. A method for identifying errors produced by a tape drive, comprising:
    reading in data from media and creating a data stream therefrom;
    identifying a preamble portion of the data stream, wherein the preamble portion is not decoded;
    identifying the signal characteristics of the preamble portion; and
    comparing the signal characteristics of the preamble portion with a set of saved signal characteristics to determine if errors are being introduced into the data stream by the head of the tape drive.

17. The method for identifying errors produced by a tape drive of claim 16, wherein the step of comparing the signal characteristics of the preamble portion with a set of saved signal characteristics comprises,
    calculating a set of gain control settings for the preamble portion of the signal; and
    comparing the calculated set of gain control settings with a saved set of gain control settings.

18. The method for identifying errors produced by a tape drive of claim 17, wherein the saved set of gain control settings are a baseline set of gain control settings associated with clean tape drive heads.

19. The method for identifying errors produced by a tape drive of claim 18, wherein the saved set of gain control settings in local storage of the tape drive.

20. The method for identifying errors produced by a tape drive of claim 16, wherein the signal characteristics of the undecoded portion of the signal comprise at least one of signal asymmetry, noise, and amplitude.

* * * * *